US012611593B2

(12) United States Patent
Ma

(10) Patent No.: US 12,611,593 B2
(45) Date of Patent: Apr. 28, 2026

(54) GAMEPAD

(71) Applicant: GUANGZHOU CHICKEN RUN NETWORK TECHNOLOGY CO., LTD., Guangzhou (CN)

(72) Inventor: Yao Ma, Guangzhou (CN)

(73) Assignee: GUANGZHOU CHICKEN RUN NETWORK TECHNOLOGY CO., LTD., Guangzhou (CN)

( * ) Notice: Subject to any disclaimer, the term of this patent is extended or adjusted under 35 U.S.C. 154(b) by 333 days.

(21) Appl. No.: 18/550,954

(22) PCT Filed: May 30, 2022

(86) PCT No.: PCT/CN2022/095918
§ 371 (c)(1),
(2) Date: Sep. 15, 2023

(87) PCT Pub. No.: WO2023/201848
PCT Pub. Date: Oct. 26, 2023

(65) Prior Publication Data
US 2025/0073575 A1 Mar. 6, 2025

(30) Foreign Application Priority Data

Apr. 18, 2022 (CN) .......................... 202220891125.8

(51) Int. Cl.
*A63F 13/24* (2014.01)
*A63F 13/23* (2014.01)
(52) U.S. Cl.
CPC .............. *A63F 13/24* (2014.09); *A63F 13/23* (2014.09)
(58) Field of Classification Search
CPC ................................. A63F 13/24; A63F 13/23
See application file for complete search history.

(56) References Cited

U.S. PATENT DOCUMENTS

2021/0275907 A1* 9/2021 Khaira ..................... A63F 13/24
2024/0226722 A1* 7/2024 Chen ........................ A63F 13/98

FOREIGN PATENT DOCUMENTS

CN 107715450 A 2/2018
CN 108579073 A 9/2018
(Continued)

OTHER PUBLICATIONS

Backbone One, Internet:<URL:https://www.4gamer.net/games/999/G999902/20210406040/> [Searched Oct. 4, 2024] (11 pages).
(Continued)

*Primary Examiner* — Yingchuan Zhang
(74) *Attorney, Agent, or Firm* — Hunton Andrews Kurth LLP

(57) ABSTRACT

Provided is a gamepad. The gamepad includes a first main unit, a second main unit, and a connection plate. The first main unit includes a main unit body, an interface assembly, and a horizontally moving assembly. The interface assembly is disposed in the main unit body, where an end of the interface assembly passes through an opening of the main unit body and then is connectable to the device to be connected. The horizontally moving assembly includes a first resilient block and a first resilient member that are sequentially disposed along a first direction, where the first resilient block and the first resilient member are disposed in the main unit body, a first end of the first resilient block is connected to the interface assembly, and a second end of the first resilient block is connected to a first end of the first resilient member.

8 Claims, 4 Drawing Sheets

(56) References Cited

FOREIGN PATENT DOCUMENTS

| CN | 110559650 A | 12/2019 |
|----|-------------|---------|
| CN | 210205854 U | 3/2020 |
| CN | 211215379 U | 8/2020 |
| CN | 213407704 U | 6/2021 |
| CN | 213724804 U | 7/2021 |
| CN | 215497253 U | 1/2022 |
| JP | 2014054502 A | 3/2014 |

OTHER PUBLICATIONS

Decision to Grant a Patent issued in corresponding JP 2023555246 dated Feb. 4, 2025 (5 pages).
GameSir X2 USB-C controller, Internet:<URL:https://androplus.jp/entry/19187/> [Searched Oct. 4, 2024] (13 pages).
Notice of Reasons for Refusal issued in corresponding JP 2023555246 dated Oct. 15, 2024 (7 pages).
International Search Report, issued from the International Search Authority, to International Application No. PCT/CN2022/095918, mailed on Dec. 15, 2022, 11 pages.

* cited by examiner

GAMEPAD

CROSS-REFERENCE TO RELATED APPLICATION

This is a National stage application, filed under 37 U.S.C. 371, of International Patent Application NO. PCT/CN2022/095918, filed on May 30, 2022, which is based on and claims priority to Chinese Patent Application No. 202220891125.8 filed with the China National Intellectual Property Administration (CNIPA) on Apr. 18, 2022, the disclosure of which is incorporated herein by reference in its entirety.

TECHNICAL FIELD

The present disclosure relates to the technical field of gamepads, for example, a gamepad.

BACKGROUND

A gamepad in the related art is connected to a mobile phone via a universal serial bus (USB) interface. However, the USB interface on the gamepad is a fixed interface, which is inconvenient for a player to mount the mobile phone to the USB interface. In addition, when the mobile phone is plugged into or unplugged from the USB interface, the USB interface and a mobile phone body are easily damaged. In addition, the gamepad with the fixed interface has low universality and is not applicable to mobile phones of various sizes.

SUMMARY

The present disclosure provides a gamepad to solve the problem that a mobile phone in the related art is not easily mounted on a gamepad and the problem that the gamepad is not applicable to mobile phones of various sizes.

The present disclosure provides a gamepad. The gamepad includes a first main unit and a second main unit that are disposed opposite to each other along a first direction and a connection plate that connects the first main unit to the second main unit and is used for placement of a device to be connected, where the first main unit includes a main unit body, an interface assembly, and a horizontally moving assembly.

The interface assembly is disposed in the main unit body, where the main unit body is provided with an opening, and an end of the interface assembly passes through the opening of the main unit body and then is connectable to the device to be connected.

The horizontally moving assembly includes a first resilient block and a first resilient member that are sequentially disposed along the first direction, where the first resilient block and the first resilient member are both disposed in the main unit body, a first end of the first resilient block is connected to the interface assembly, and a second end of the first resilient block is connected to a first end of the first resilient member, and a second end of the first resilient member abuts against an inner wall of the main unit body so that the first resilient block always has a tendency to move towards the interface assembly.

Figure 1:
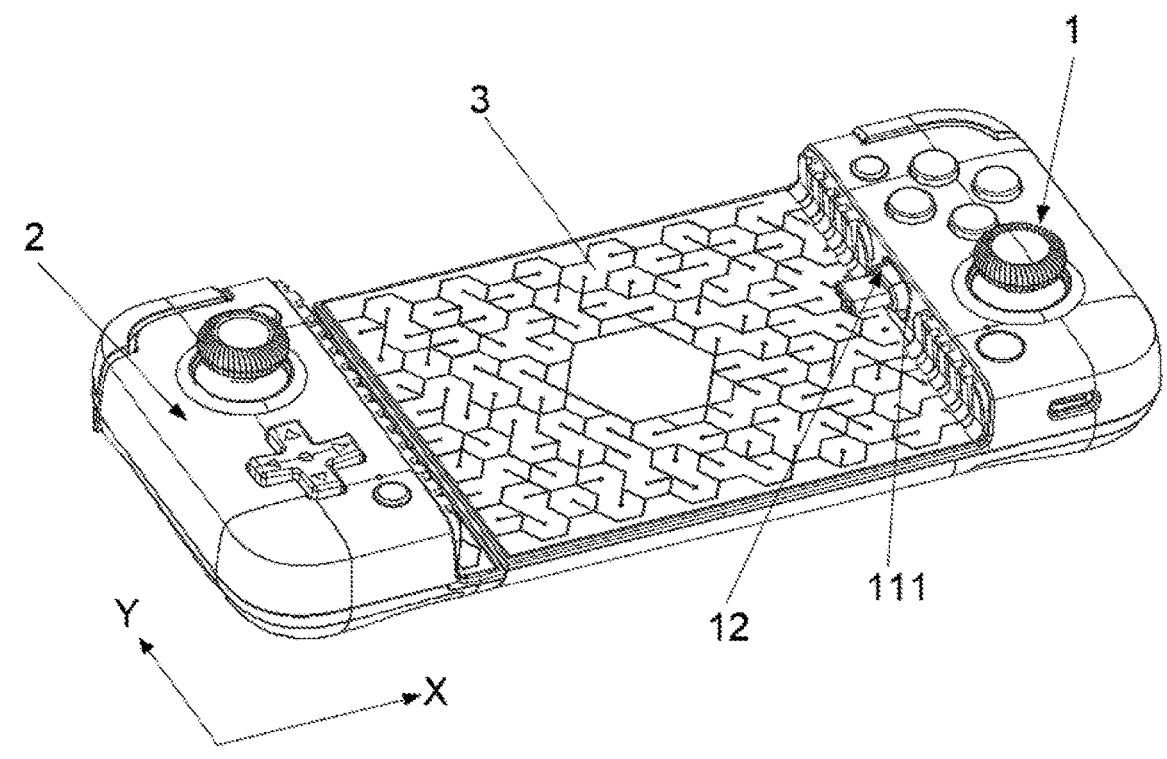
FIG. 1 is a structure view of a gamepad according to an embodiment of the present disclosure.
Figure 2:
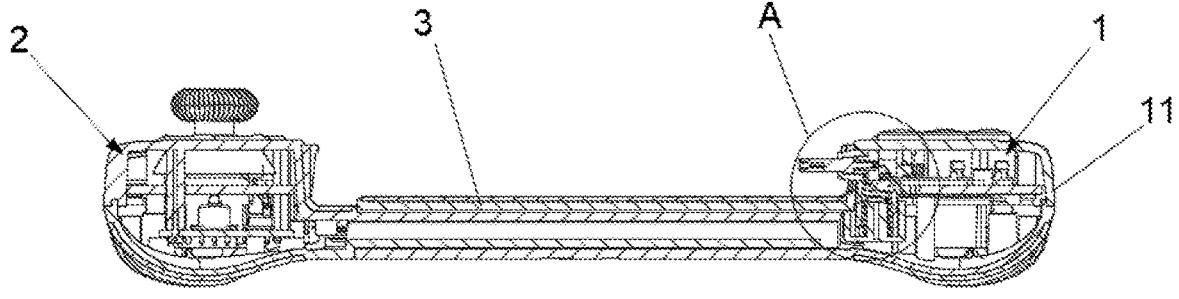
FIG. 2 is a sectional view of a gamepad according to an embodiment of the present disclosure.

REFERENCE LIST 1 first main unit
11 main unit body
111 opening
12 interface assembly
121 rotating portion
13 horizontally moving assembly
131 first resilient block
1311 first limiting portion
1312 second limiting portion
1313 sliding slot
132 first resilient member
14 vertically moving assembly
141 second resilient block
1411 engagement slot
142 second resilient member
143 support base
1431 support wall
2 second main unit
3 connection plate

DETAILED DESCRIPTION

The present disclosure is described below in conjunction with the drawings. The embodiments described below are part, not all, of embodiments of the present disclosure.

In the description of the present disclosure, it is to be noted that orientations or position relations indicated by terms such as "center", "upper", "lower", "left", "right", "vertical", "horizontal", "in", and "out" are based on the drawings. These orientations or position relations are intended to facilitate and simplify the description of the present disclosure and not to indicate or imply that a device or element referred to as such particular orientations or is configured or operated in such particular orientations. In addition, terms such as "first" and "second" are used only for the purpose of description and are not to be construed as indicating or implying relative importance. Terms "first position" and "second position" are two different positions. Moreover, when a first feature is described as "on", "above", or "over" a second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

In the description of the present disclosure, terms "mounted", "joined", and "connected" are to be understood in a broad sense. For example, the term "connected" may refer to "securely connected", "detachably connected", or "integrally connected", may refer to "mechanically connected" or "electrically connected", or may refer to "connected directly", "connected indirectly through an intermediary", or "connected inside two elements". For those of ordinary skill in the art, meanings of the preceding terms in the present disclosure may be understood based on actual situations.

The embodiments of the present disclosure are described below: Examples of the embodiments are shown in the drawings, where the same or similar reference numerals indicate the same or similar elements or elements having the same or similar functions. The embodiments described below with reference to the drawings are exemplary and are intended to explain the present disclosure.

This embodiment provides a gamepad (for example, a gamepad with a flexible interface), where the gamepad is connectable to a device to be connected and used for assisting in the operation of the device to be connected.

As shown in FIGS. 1 to 6, the gamepad includes a first main unit 1 and a second main unit 2 that are disposed opposite to each other along a first direction (that is, an X direction in the drawing), and a connection plate 3 that connects the first main unit 1 to the second main unit 2 and is used for the placement of the device to be connected. The first main unit 1 includes a main unit body 11, an interface assembly 12, and a horizontally moving assembly 13. The interface assembly 12 is disposed in the main unit body 11, and an opening 111 is provided on the main unit body 11, where an end of the interface assembly 12 passes through the opening 111 of the main unit body 11 and then is connectable to the device to be connected, thereby implementing the electrical connection of the device to be connected to the gamepad. Thus, it is convenient for a user to operate the device to be connected by operating the gamepad instead. In an embodiment, one end of the interface assembly 12 is configured to be connected to the device to be connected, and the other end of the interface assembly 12 is communicatively connected to a circuit board in the main unit body 11.

The horizontally moving assembly 13 includes a first resilient block 131 and a first resilient member 132 that are sequentially disposed along the first direction, where the first resilient block 131 and the first resilient member 132 are both disposed in the main unit body 11, a first end of the first resilient block 131 is connected to the interface assembly 12, and a second end of the first resilient block 131 is connected to a first end of the first resilient member 132, and a second end of the first resilient member 132 abuts against an inner wall of the main unit body 11 so that the first resilient block 131 always has a tendency to move towards the interface assembly 12. Thus, the first resilient block 131 can drive the interface assembly 12 to move toward the outside of the main unit body 11, so as to ensure that part of the interface assembly 12 can be disposed outside the main unit body 11. In addition, the movement of the interface assembly 12 along the first direction can cause the gamepad to be applied to various sizes of devices to be connected, facilitating the mounting of the devices to be connected. Moreover, when the device to be connected is connected to or separated from the interface assembly 12, the interface assembly 12 moving along the first direction can have a cushioning function. Thus, when the interface assembly 12 is rigidly connected to the device to be connected, damage to both the interface assembly 12 and the device to be connected is avoidable. Optionally, the device to be connected is a smartphone with a touchscreen, and the interface assembly 12 is a joint with a USB interface. The devices to be connected may be other types of devices.

As shown in FIGS. 3 to 6, the first resilient block 131 has a first limiting portion 1311 and a second limiting portion 1312 that are disposed opposite to each other along a second direction (that is, a Y direction in the drawing), where two ends of the interface assembly 12 along the second direction are connected to the first limiting portion 1311 and the second limiting portion 1312 respectively, and an end of each of the first limiting portion 1311 and the second limiting portion 1312 along the first direction can abut against a sidewall of the main unit body 11 at the opening 111. Thus, the part of the interface assembly 12 can be limited in the main unit body 11 by the first limiting portion 1311 and the second limiting portion 1312 so that the case is avoided where the interface assembly 12 is moved to be disengaged from the first main unit 1 when the device to be connected is unplugged, which avoids damage to the first main unit 1.

In an embodiment, each of two ends of the interface assembly 12 along the second direction is provided with a rotating portion 121, where the interface assembly 12 is rotatably disposed on the first resilient block 131 through the rotating portions 121. Thus, when using the gamepad, the user can first rotate the interface assembly 12 and then connect the interface assembly 12 to the device to be connected, thereby reducing the difficulty in mounting and disassembling the device to be connected.

In an embodiment, each of the first limiting portion 1311 and the second limiting portion 1312 is provided with a sliding slot 1313 extending along a vertical direction and each of the rotating portions 121 is disposed in a respective sliding slot 1313 so that the interface assembly 12 is slidable in the sliding slot 1313 along the vertical direction through the first limiting portion 1311 and the second limiting portion 1312. Thus, the movement of the interface assembly 12 along the vertical direction can cause the gamepad to be applied to devices to be connected having different thicknesses and facilitates the mounting of the devices to be connected. Optionally, as shown in FIG. 1, the length of the opening 111 of the main unit body 11 in the vertical direction is greater than the length of the interface assembly 12 in the vertical direction so that the interface assembly 12 is movable in the vertical direction and the rotation of the interface assembly 12 is facilitated. In addition, the length of the opening 111 of the main unit body 11 in the vertical direction can define the movement range of the interface assembly 12 in the vertical direction, where the first direction, the second direction, and the vertical direction are perpendicular to each other.

The gamepad in this embodiment has high universality. Through movement of the interface assembly 12 in the first direction and the vertical direction and rotation of the interface assembly 12 itself, a position of the interface assembly 12 on the first main unit 1 can be changed flexibly, thereby satisfying mounting requirements of different types of devices to be connected.

Figure 3:
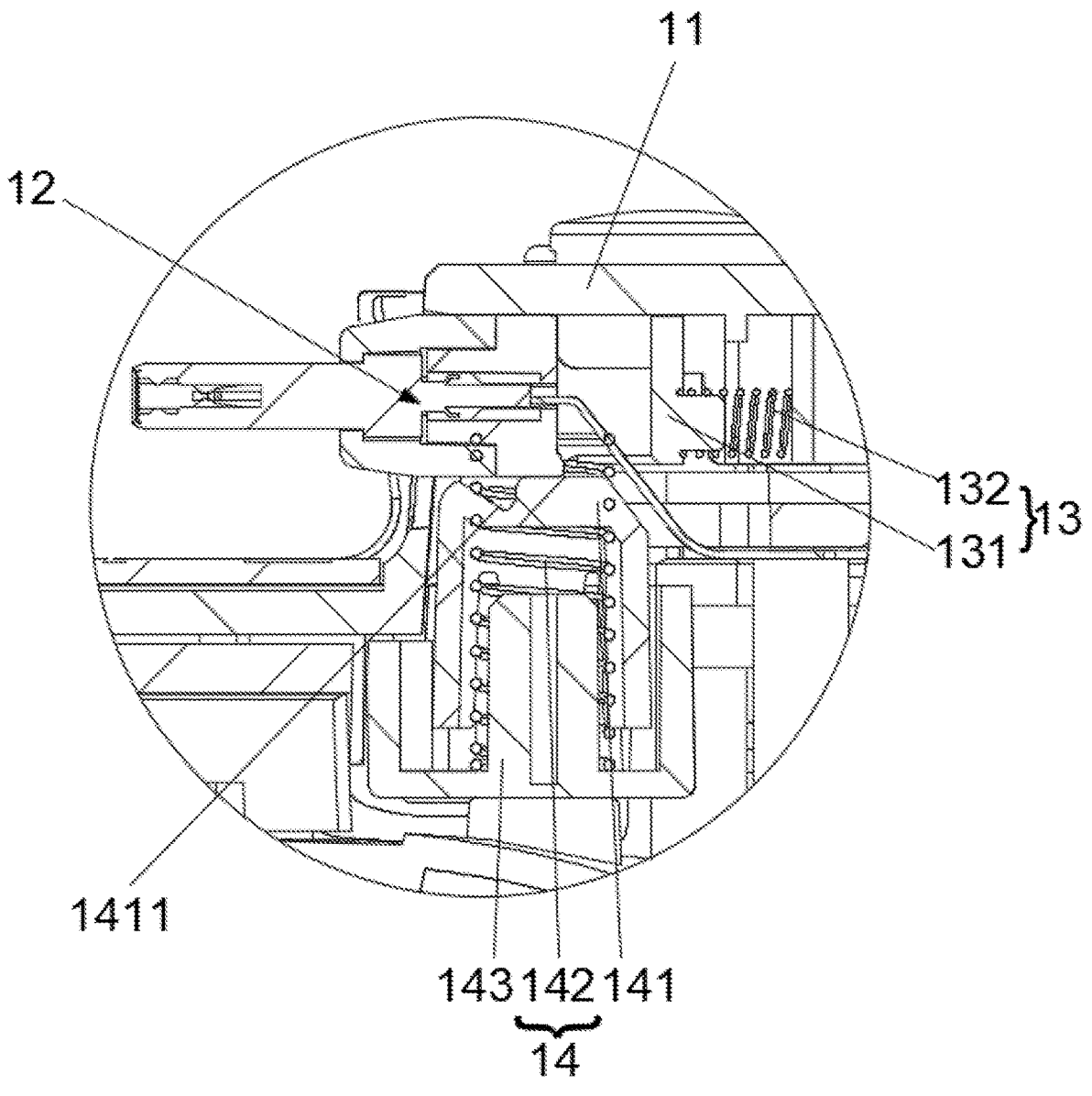
FIG. 3 is a partial enlarged view of a part A in FIG. 2.
Figure 4:
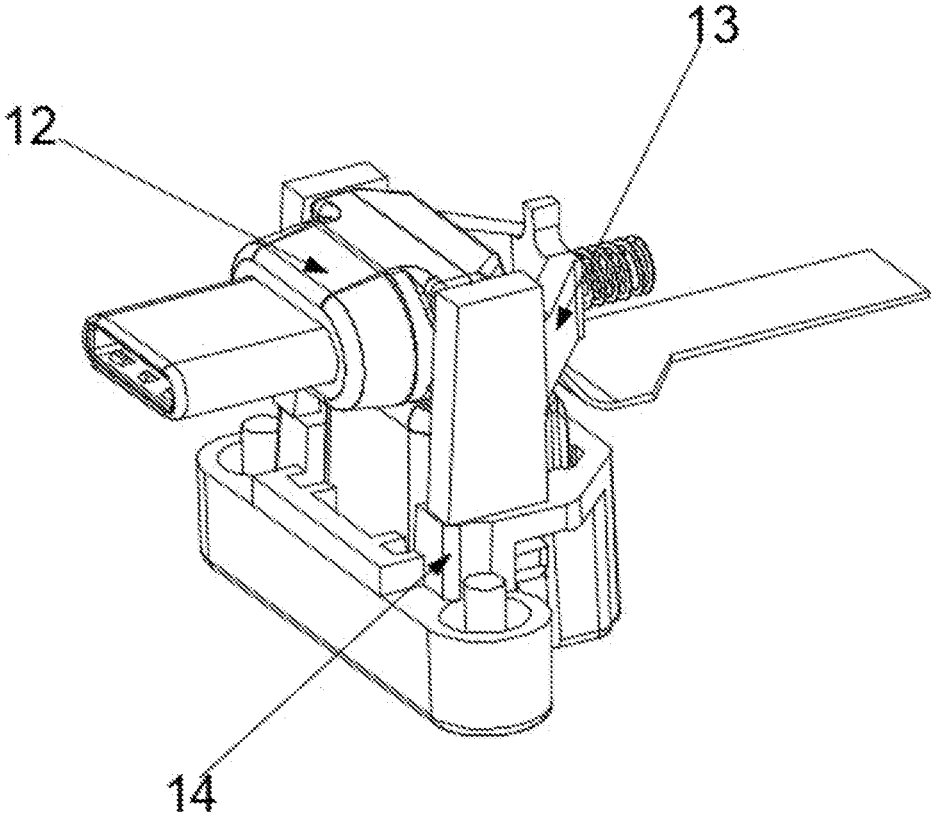
FIG. 4 is a structure view showing part of structures of a gamepad according to an embodiment of the present disclosure.
Figure 5:
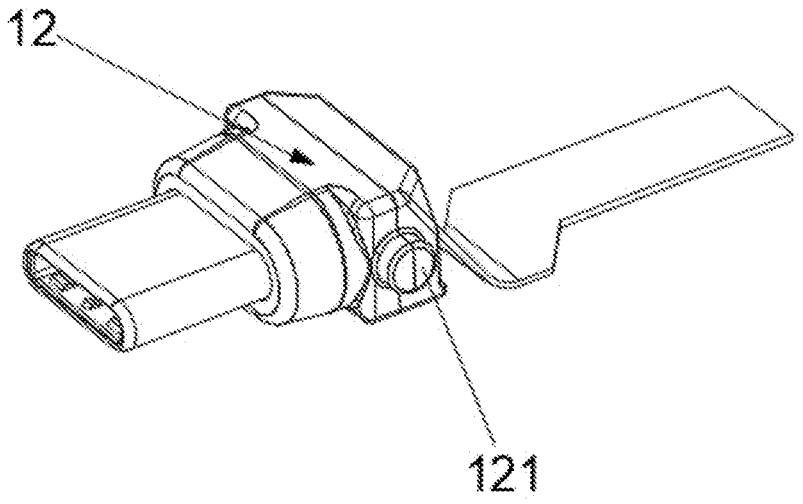
FIG. 5 is a structure view of an interface assembly according to an embodiment of the present disclosure.

As shown in FIGS. 3 and 4, the first main unit 1 further includes a vertically moving assembly 14 disposed in the main unit body 11 and below the interface assembly 12; and a drive end of the vertically moving assembly 14 abuts against the interface assembly 12 and is configured to drive the interface assembly 12 to move upward along the vertical direction. Thus, the interface assembly 12 is driven by the vertically moving assembly 14 so that the interface assembly 12 is always movable upward, so as to cause an upper end of the interface assembly 12 to abut against the inner wall of the main unit body 11. When the device to be connected is mounted, the user does not need to manually hold the interface assembly 12, thereby reducing the difficulty in mounting and disassembling the device to be connected.

In an embodiment, the vertically moving assembly 14 includes a second resilient block 141, a second resilient member 142, and a support base 143, where the support base 143 is disposed on the main unit body 11, the second resilient block 141 and the support base 143 are disposed opposite to each other along the vertical direction, a first end of the second resilient block 141 abuts against the interface assembly 12, a second end of the second resilient block 141 abuts against a first end of the second resilient member 142, and a second end of the second resilient member 142 abuts against the support base 143, so that the second resilient block 141 always has a tendency to move towards the interface assembly 12. Thus, the second resilient block 141 can jack up the interface assembly 12 so that the interface assembly 12 moves upward. The support base 143 has a support wall 1431, where a lower end of the first resilient block 131 abuts against the support wall 1431, and the first resilient block 131 is slidable on the support wall 1431 along the first direction. Further, the first resilient block 131 can be supported by the support wall 1431, and the first resilient block 131 can be limited in the vertical direction by the support wall 1431 and the inner wall of the main unit body 11 so that the stability of the first resilient block 131 when the first resilient block 131 slides on the support wall 1431 is ensured, thereby avoiding a jamming phenomenon. Optionally, both the first resilient member 132 and the second resilient member 142 are springs. The first resilient member 132 and the second resilient member 142 may be other resilient parts.

Figure 6:
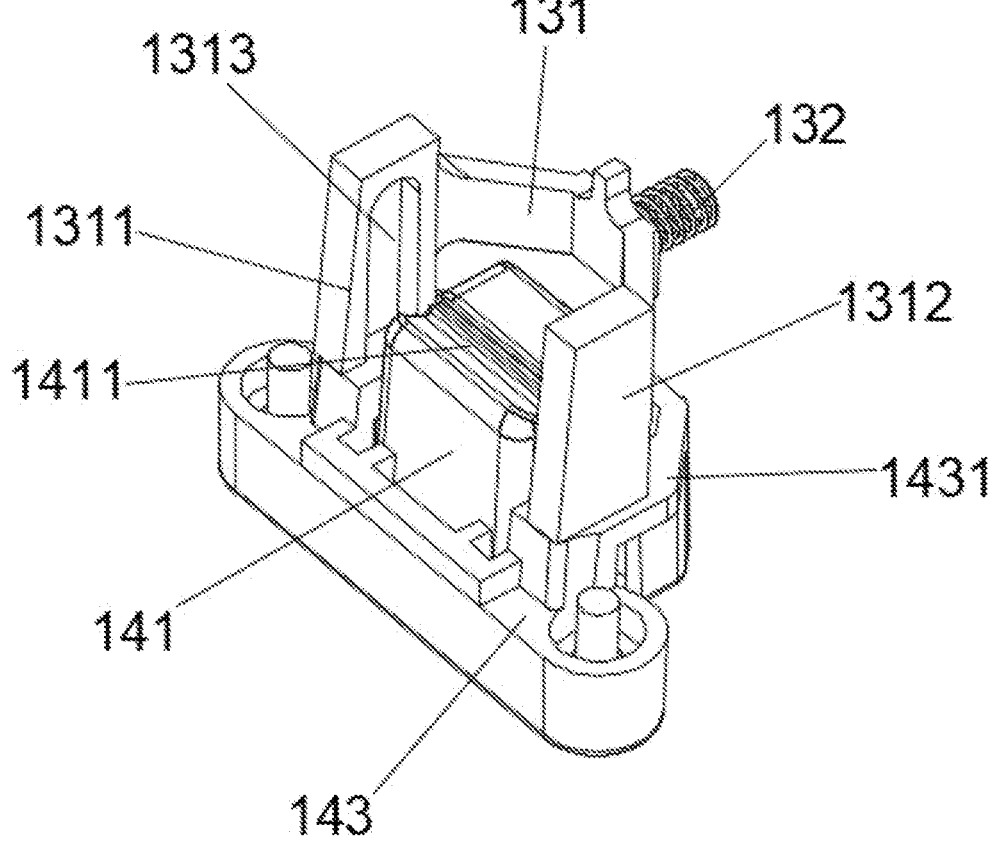
FIG. 6 is a structure view of a horizontally moving assembly and a vertically moving assembly according to an embodiment of the present disclosure.

As shown in FIGS. 3 and 6, an engagement slot 1411 is obliquely disposed at a top end of the second resilient block 141, where the interface assembly 12 can be engaged in the engagement slot 1411 after rotation. Thus, the interface assembly 12 is rotated first to be engaged in the engagement slot 1411, which can facilitate the mounting of the device to be connected by the user. Moreover, after the device to be connected is placed on the connection plate 3, the interface assembly 12 can be automatically reset through rotation. Optionally, the engagement slot 1411 and a level form an included angle that is less than 90 degrees so that after the interface assembly 12 is engaged with the engagement slot 1411, the interface assembly 12 and the level form an included angle that is also less than 90 degrees. Thus, this degree range is adaptable to mounting degrees when most users plug the devices to be connected.

The gamepad provided by the present disclosure includes the first main unit and the second main unit that are disposed opposite to each other along the first direction, and the connection plate that connects the first main unit to the second main unit and is used for the placement of the device to be connected, where the first main unit includes the main unit body, the interface assembly, and the horizontally moving assembly. The interface assembly is disposed in the main unit body, and the opening is provided on the main unit body, where the end of the interface assembly passes through the opening of the main unit body and then is connectable to the device to be connected, thereby implementing the electrical connection of the device to be connected to the gamepad. Thus, it is convenient for the user to operate the device to be connected by operating the gamepad instead. The horizontally moving assembly includes the first resilient block and the first resilient member that are sequentially disposed along the first direction, where the first resilient block and the first resilient member are both disposed in the main unit body, the first end of the first resilient block is connected to the interface assembly, and the second end of the first resilient block is connected to the first end of the first resilient member, and the second end of the first resilient member abuts against the inner wall of the main unit body so that the first resilient block always has the tendency to move towards the interface assembly. Thus, the first resilient block can drive the interface assembly to move toward the outside of the main unit body, so as to ensure that the part of the interface assembly can be disposed outside the main unit body. In addition, the movement of the interface assembly along the first direction can cause the gamepad to be applied to the various sizes of devices to be connected, facilitating the mounting of the devices to be connected. Moreover, when the device to be connected is connected to or separated from the interface assembly, the interface assembly moving along the first direction can have the cushioning function. Thus, when the interface assembly is rigidly connected to the device to be connected, the damage to both the interface assembly and the device to be connected is avoidable.

What is claimed is:

1. A gamepad, comprising a first main unit, a second main unit and a connection plate that connects the first main unit to the second main unit, wherein the first main unit and the second main unit are disposed opposite to each other along a first direction, the connection plate is configured to place a device to be connected, and the first main unit comprises:

a main unit body;

an interface assembly disposed in the main unit body, wherein the main unit body is provided with an opening, and an end of the interface assembly passes through the opening of the main unit body and then is connectable to the device to be connected; and a horizontally moving assembly comprising a first resilient block and a first resilient member that are sequentially disposed along the first direction, wherein the first resilient block and the first resilient member are both disposed in the main unit body, a first end of the first resilient block is connected to the interface assembly, and a second end of the first resilient block is connected to a first end of the first resilient member, and a second end of the first resilient member abuts against an inner wall of the main unit body, so that the first resilient block always has a tendency to move towards the interface assembly;

wherein the first resilient block has a first limiting portion and a second limiting portion that are disposed opposite to each other along a second direction, wherein two ends of the interface assembly along the second direction are connected to the first limiting portion and the second limiting portion respectively, and an end of each of the first limiting portion and the second limiting portion along the first direction is capable of abutting against on a sidewall of the main unit body at the opening; and wherein rotating portions are disposed at each of the two ends of the interface assembly along the second direction is provided with a rotating portion, wherein the interface assembly is rotatably disposed on the first resilient block through the rotating portion.

2. The gamepad according to claim 1, wherein each of the first limiting portion and the second limiting portion is provided with a sliding slot extending along a vertical direction, and the rotating portion is disposed in a respective sliding slot.

3. The gamepad according to claim 2, wherein the first main unit further comprises a vertically moving assembly disposed in the main unit body and located below the interface assembly; and a drive end of the vertically moving assembly abuts against the interface assembly and is configured to drive the interface assembly to move upward along the vertical direction.

4. The gamepad according to claim 3, wherein the vertically moving assembly comprises a second resilient block, a second resilient member, and a support base, wherein the support base is disposed on the main unit body, the second resilient block and the support base are disposed opposite to each other along the vertical direction, a first end of the second resilient block abuts against the interface assembly, and a second end of the second resilient block abuts against a first end of the second resilient member, and a second end of the second resilient member abuts against the support base so that the second resilient block always has a tendency to move towards the interface assembly.

5. The gamepad according to claim 4, wherein an engagement slot is obliquely disposed at a top end of the second resilient block, wherein the interface assembly is capable of being engaged in the engagement slot after rotation.

6. The gamepad according to claim 5, wherein the engagement slot and a level form an included angle that is less than 90 degrees.

7. The gamepad according to claim 4, wherein the support base has a support wall, wherein a lower end of the first resilient block abuts against the support wall, and the first resilient block is slidable on the support wall along the first direction.

8. The gamepad according to claim 2, wherein a length of the opening of the main unit body in the vertical direction is greater than a length of the interface assembly in the vertical direction.

* * * * *